May 12, 1964  C. W. DOERING ETAL  3,132,556
RELEASABLE SAFETY COUPLING PIN
Filed June 7, 1961  2 Sheets-Sheet 1
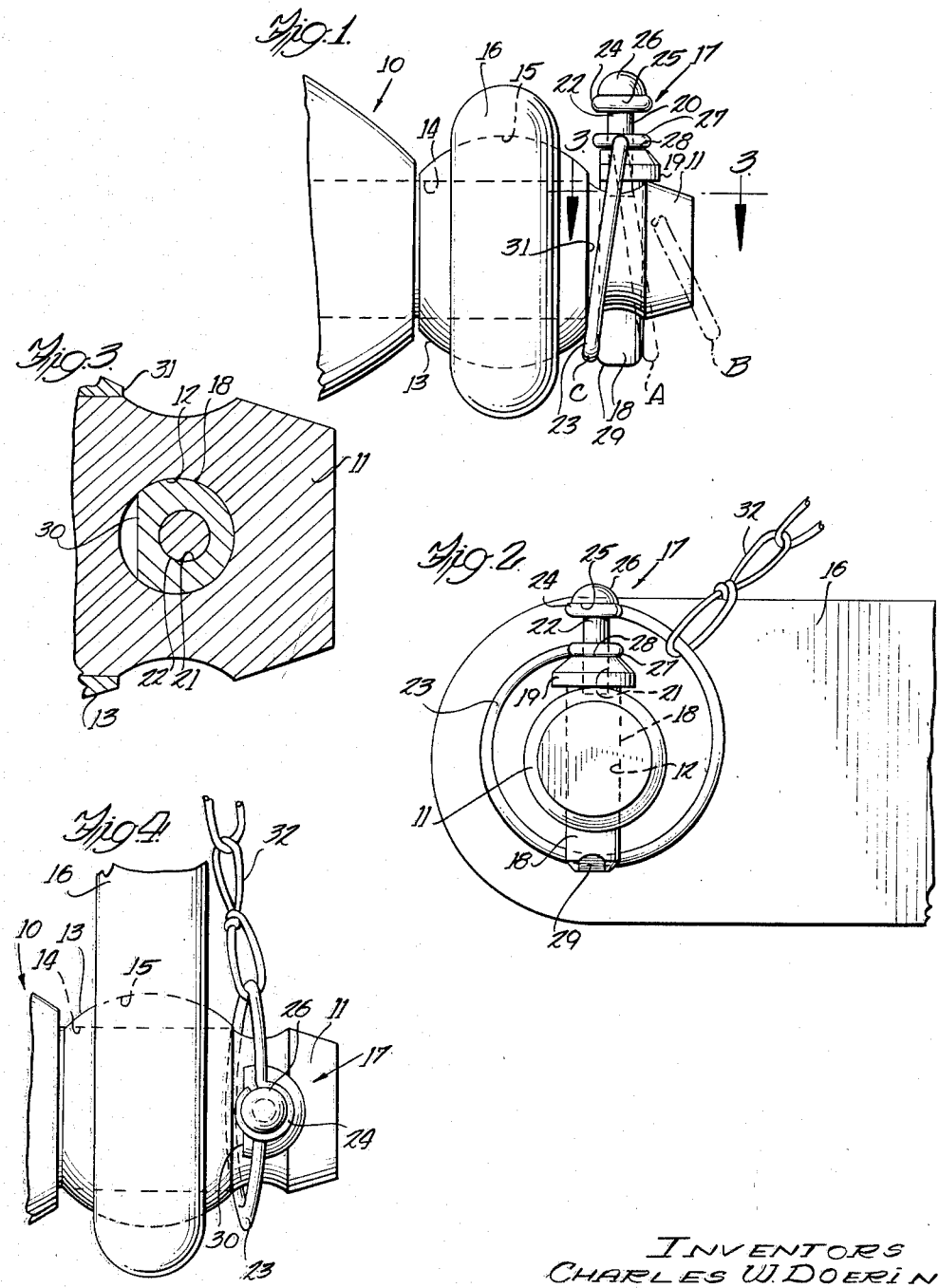
INVENTORS
CHARLES W. DOERING
GORDON L. HERSHMAN
Paul O. Pippel
ATTORNEY

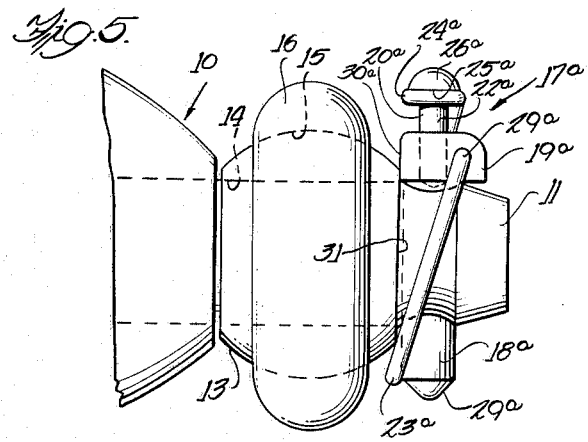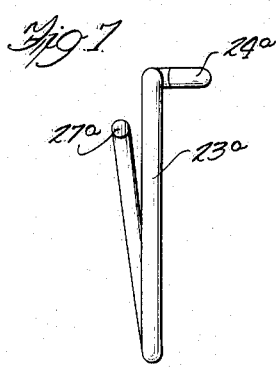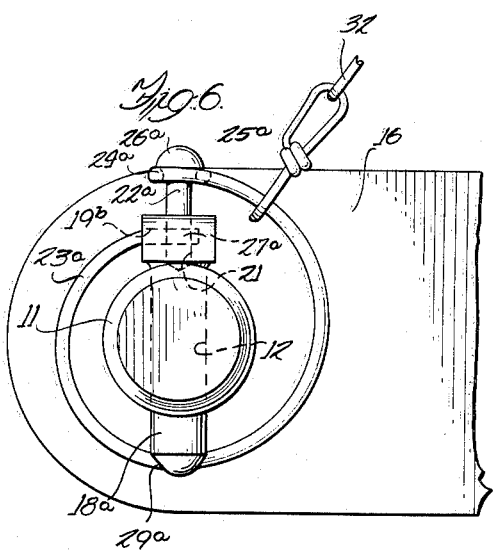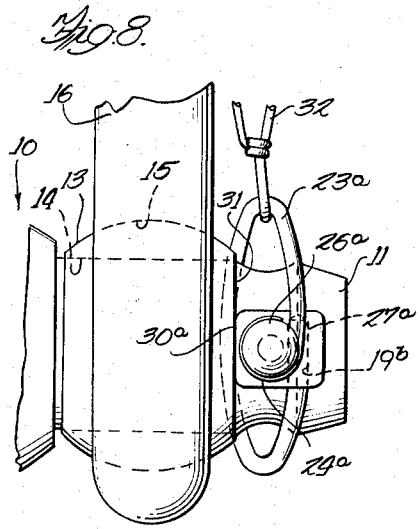

ial@ United States Patent Office 3,132,556
Patented May 12, 1964

3,132,556
RELEASABLE SAFETY COUPLING PIN
Charles W. Doering, Westchester, and Gordon L. Hershman, La Grange, Ill., assignors to International Harvester Company, Chicago, Ill., a corporation of New Jersey
Filed June 7, 1961, Ser. No. 115,444
6 Claims. (Cl. 85—5)

This invention relates to fastening devices and more particularly to a quickly releasable securing or coupling locking pin.

In coupling or attaching argricultural implements or drawbars to the hitch mechanisms of a propelling vehicle, it is usually customary to effect the coupling or connection by inserting a transversely extending pin-like shaft or attaching arm portion of the implement or drawbar into an aperture, provided therefor in a link arm of the hitch mechanism carried by the propelling tractor vehicle, and thereafter inserting through a transversely extending opening in said pin-like shaft or arm a releasable safety type of fastening pin in order to prevent accidental separation or disengagement of the attached or coupled elements. Heretofore, a great variety of quick release and safety type of fastening or locking pins have been provided for this purpose and such interlocking means, commonly referred to in the art as "Lynch pins," are well known for the purpose of holding parts of couplings or connectors in assembled relation. A coupling pin of this character is disclosed in the U.S. Patents No. 2,856,806, issued to Charles W. Gibbons, Jr., and No. 2,674,169, issued to F. D. Sawyer.

It is a primary object of this invention, therefore, to provide an improved Lynch pin construction.

Another object is to provide a coupling locking pin having novel means associated therewith for preventing the accidental disengagement of said pin after it has been positioned for securing two elements of a coupling together in assembled relation.

A further object is to provide a readily insertable and removable coupling fastening pin which is simple and inexpensive to fabricate and which, additionally, is extremely secure, reliable, and safe against accidental dislodgment after initial positioning.

A still further object is to provide a simple and efficient locking or retaining coupling pin which is adapted to be inserted into or readily released from a radially extending opening in one of the elements of a coupling, and wherein after said pin is inserted in said opening the co-operating elements of the coupling are inseparable one from the other without removal of said pin by manual effort.

A yet still further object is to provide a locking pin including a pin-like body or stem portion having a head-like abutment formed on one end thereof and having a coiled resilient keeper ring mounted on said body proximate said head and adapted for swinging movement past the opposite end thereof to one side of said body or the other as a result of distortion or deflection of said ring by manual manipulation.

Another important and general object is to provide an improved releasable type of fastening pin construction for holding elements of a coupling or connector in assembled relation.

Further objects and advantages of the invention will become apparent as the following description proceeds, and the features of novelty which characterize the invention will be pointed out with particularity in the claims annexed to and forming a part of this specification. For a better understanding of the invention, references may be had to the accompanying drawings, in which:

FIGURE 1 is an end elevational view of the proposed locking pin as employed with an implement-attaching coupling, the latter being only fragmentarily shown;

FIGURE 2 is a front elevational view of the retaining pin device shown in FIGURE 1;

FIGURE 3 is a fragmentary horizontal sectional view in enlarged dimension taken generally along the line 3—3 of FIGURE 1;

FIGURE 4 is a top plan view of the pin device shown in the preceding views;

FIGURE 5 is a view similar to FIGURE 1 but showing a modified form of the proposed fastening pin;

FIGURE 6 is a front elevational view of the modified pin shown in FIGURE 5;

FIGURE 7 is an end elevational view of the resilient coil ring keeper member used in the form of the invention shown in FIGURES 5 and 6; and FIGURE 8 is a top plan view of the modified form of pin device shown in the immediately preceding views.

Referring now to the drawings, it will be seen that the proposed invention is shown as applied for securing or holding an agricultural implement coupled or fastened to the hitch mechanism of a farm tractor although it will be appreciated that it is not to be limited to the specific application illustrated. An agricultural implement indicated only fragmentarily at 10 includes a transversely extending attaching stud shaft or pin-like arm member 11 having a diametrically extending pin-receiving aperture 12 therethrough that is spaced inwardly from a free or outboard end of said arm member. A spherical-shaped connector member 13 having an aperture 14 therethrough is positioned over the shaft member 11 and is pivotally secured in a socket 15 in one end of a hitch link arm 16 while the opposite end of said link arm is adapted for pivotal connection by any suitable or well-known means to a propelling vehicle such as an agricultural tractor (not shown). As thus arranged, the implement and its attaching stud shaft 11 becomes universally mounted within the hitch link arm 16 as is conventional and well understood in the art. It will, also, be understood that the opposite side of the implement will usually be provided with a similar coupling or attaching means but, since it would accomplish no useful purpose to illustrate this multiplication of similar elements in the drawings, they have been omitted therefrom.

In practice, it is customary to provide some form of readily insertable and removable interlocking or securing pin means for the shaft aperture 12 so that when such pin is interlockingly positioned in the aperture it prevents the shaft 11 from slipping out of the connector aperture 14 and accidentally disengaging the assembled elements of the connector or coupling. The specific teaching of the present invention is concerned with the provision of an improved form of a releasable securing or Lynch pin for the purpose aforesaid.

In FIGURES 1-4 a pin member, indicated in its entirety by the reference numeral 17, includes a stem or body portion 18 wth an enlarged abutment-forming collar or head 19 at one end thereof. Although the pin, as shown, is generally circular in cross-section, it will be appreciated that it may be otherwise formed without deviating from any of the teachings hereof. Extending from the headed end of the stem or pin body there may be provided a drive or headed stud such as 20 which may be suitably affixed to or formed with the stem or pin body so as to project axially therefrom. As shown, an axially extending recess 21 provided in the headed end of the stem or body is dimensioned to receive in a driving fit therein an end portion of the shank 22 of the drive stud 20 and when so insertably driven it becomes fixedly secured therein. If desired, of course, the pin member may be fashioned by molding, casting, forging, or any other suitable and well known means so as to form the drive stud element as an integral portion of the stem or pin body and thus eliminate fabricating these parts separately and having to subsequently insert the drive stud into the recess in the pin body. In either arrangement or construction the ultimate result will provide a pin member fashioned with a shank-like portion thereof that may, if desired, be of a reduced diameter or cross-section, and which extends between two spaced-apart radially extending surfaces that function to provide abutment shoulders at the opposite ends of said shank portion. Since the pin member 17 does serve to provide a retaining function in preventing the shaft 11 slipping away or becoming dislodged from its associated link arm 16 said pin member is frequently spoken of as a retaining pin, and hence the use of such terminology included in this description is in order.

A split, coiled keeper-like generally spiral-shaped ring 23 of suitable resilient material, such as one of the well-known metals, has one end thereof looped to provide an eye 24 which encircles or wraps around the stud shank 22 and axially abuts a shoulder surface 25 defined by a radially extending surface of the head 26, while the opposite end of said ring is looped to provide an eye such as 27 that encircles or wraps around said stud shank and axially abuts a shoulder surface 28 defined by a radially extending surface of the collar or head 19. The ring is tensioned so that normally the free or bail portion of the convolution thereof is biased to abuttingly engage the outer surface of the stem or body member 18, regardless of whether the ring may be positioned against the inboard or outboard area or surface of the stem. Since a retaining pin of the character described herein is most generally, although not always, employed in a vertical position the shoulder surface 25 might be called the lower or underside surface of the head 26 while the shoulder 28 might be termed the upper or top surface of the collar or head 19. The ring 23 is dimensioned so that the diameter of the spiral loop or arcuate bail defined thereby is not large enough to normally permit said bail or loop portion of the ring being swingably passed over or by the opposite or beveled end 29 of the pin 17 without distorting or deflecting the ring across the diameter thereof to permit such passage to be accomplished. The eyes 24 and 27, preferably, are dimensioned to provide a slightly loose or sliding motion fit relative to the shank portion 22 about which they are looped, such loose fit serving to permit manual swinging of the ring laterally out of the way of the shaft arm 11 when the pin is inserted or removed from the aperture 12 therein.

Referring to FIGURE 1, it will be seen, by reference to the position of the ring 23 indicated by the dotted lines and designated A, that when the pin 17 is inserted or removed from the aperture 12 in shaft 11 the opposite or arcuate bail portion of the spiral convolution of said ring will normally encounter or bump into the extending end portion of said shaft thereby tending to obstruct insertion or removal of the pin. In view of this, it is necessary to manually lift or swing the loop or bail portion of the ring to the right, against the reactive force of the resilient material therein, a distance sufficient to permit its being slipped in encircling relation over the outwardly extending end of the shaft 11 to the position indicated by the dot-dash lines and designated B, after which it may be released and the resiliency of the ring will be effective for bringing it to the biased outboard position wherein it is in engaging contact with the stem outer surface as indicated by the dotted lines and designated A. Now in order to effect a more secure and reliable locking of the pin in position in the aperture 12 the ring 23 is manually deflected by squeezing the eyes 24 and 27 axially closer toward one another a distance sufficient to permit the bail of the ring being slipped past the free and beveled end 29 of the retaining pin 17 to the inboard position indicated by the solid lines and designated C. As thus disposed, it will be appreciated that it becomes extremely difficult, if not impossible, to accidentally dislodge the pin 17 from the aperture 12 without first manually deflecting the ring 23, thereby insuring that the shaft 11 will not be accidentally disengaged or separated from its associated hitch link arm 16.

It will be noted in the first preferred embodiment illustrated herein that one side or face of the stem or pin body and the enlarged head thereon is cut way to provide a longitudinally extending flat surface such as indicated at 30 that is useful for preventing rotation of the pin 17 within the aperture 12. Preferably, the retaining pin 17 is positioned in circular aperture 12 with the flat surface 30 thereof facing the radially extending end face 31 of the spherical connector member 13 and is spaced slightly therefrom. As thus disposed the face 31 provides a stop or abutment means against which the head 19 will abut if the pin is rotated thereby serving as a means for preventing said pin from rotating after having been positioned.

A suitable flexible fastener, such as the chain indicated fragmentarily at 32, may be provided for attaching the retaining pin to a suitable fixed anchor or mounting on the vehicle so as to minimize the possibility of losing or misplacing the pin at times when the pin is not actually secured or locked in its operating position.

In FIGURES 5–8, inclusive, there is illustrated a slightly modified embodiment of the proposed retaining pin and in said views identical reference numerals have been used to designate like elements of the construction thereof. In this embodiment the retaining pin, generally designated 17a, includes a body or stem portion 18a with an enlarged collar or head 19a on one end thereof, and a beveled or chamfered edge 29a at the free end of the body thereof. Extending from the headed end of the pin body is an extension in the form of a drive or headed stud 20a that includes a shank-like portion 22a and a head 26a and which is suitably formed relative to the pin body and projects axially therefrom. The head or collar 19a is provided with a transversely extending recess 19b disposed in spaced or offset relation to the longitudinal axis of the pin 17a.

A split, coiled and generally spiral-shaped ring 23a of suitable resilient material has one end thereof looped to provide an eye 24a that loosely wraps around the shank 22a of stud 20a and axially abuts the shoulder surface 25a defined by the shank-side surface of the head 26a, while the opposite end 27a of the ring is but rotatably closely fitted into the recess 19b in the head or collar 19a. As before, one side face of the body member 18a may be cut away to provide a flat surface as shown at 30a.

It will be appreciated, of course, that the insertion and removal of the modified form of retaining pin is accomplished in identical fashion to that heretofore enumerated and the operation thereof is substantially identical to that detailed for the first-described embodiment herein.

It should now be apparent that a novel releasable retaining device or Lynch pin has been shown and described, and it is to be understood that changes may be made in the construction without departing from the spirit of the invention or the scope thereof as defined in the appended claims.

What is claimed is:

1. A coupling securing pin, comprising: an elongated body member having one end thereof removably insertable in an apertured element of a coupling; said body member having an enlarged head at the end thereof opposite the said one end and fashioned with a radially extending surface spaced inwardly from an outer end of said head, and an abutment-forming projection spaced from said head along the longitudinal axis of said body member and providing a radially extending surface thereon facing the radially extending surface of said head; a split, coiled resilient and generally spiral-shaped ring mounted for swinging movement on the body, and having opposite ends thereof attached to the body, one being attached proximate one of said radially extending surfaces and the other end being attached proximate the other of said radially extending surfaces, and having said ring tensioned for swinging into encircling relation to the element in the coupling into which said body member is removably insertable for anchoring said body member therein; said ring being arranged with at least one end axially movable relative to the other end thereof along the longitudinal axis of the body to permit deflection of the ring in order to permit passing the ring past the said one end of the body member while simultaneously encircling the apertured element of the coupling.

2. The structure described in claim 1 and further characterized in that at least one end of the resilient ring is attached to the body by means of a loop formed on a respective end thereof and wrapped around the body and, additionally, having said looped end disposed in axially abutting relation with one of said radially extending surfaces.

3. A coupling securing pin, comprising: an elongated body member having one end thereof removably insertable in an apertured element of a coupling; said body member having an enlarged head at the end thereof opposite the said one end and fashioned with a radially extending surface spaced inwardly from an outer end of said head, and an abutment-forming projection spaced from said head along the longitudinal axis of said body member and providing a radially extending surface thereon facing the radially extending surface of said head; a split, coiled resilient and generally spiral-shaped ring mounted for swinging movement on the body, and having opposite ends thereof attached to the body, one being attached proximate one of said radially extending surfaces and the other end being attached proximate the other of said radially extending surfaces, and having said ring tensioned for swinging into encircling relation to the element in the coupling into which said body member is removably insertable for anchoring said body member therein; said ring being fashioned with a loop at each end thereof and having said loops wrapped around the body and disposed in axially abutting relation one each with a respective one of said radially extending surfaces; said ring having the loops thereof arranged for slidable movement relative to one another along the longitudinal axis of the body to permit deflection of the ring in order to permit passing the ring past the said one end of the body member while concurrently therewith encircling the apertured element of the coupling.

4. A coupling securing pin, comprising: an elongated body member having one end thereof removably insertable in an apertured element of a coupling; said body member having a projection at the end thereof opposite the said one end and fashioned with a radially extending surface spaced axially inwardly from the outer end of said body member and an abutment-forming projection spaced from the end projection along the longitudinal axis of said body member and providing a radially extending surface thereon facing the radially extending surface on the end projection; a split, coiled resilient ring mounted for swinging movement on the body, and having opposite ends thereof attached to the body, one being attached proximate one of said radially extending surfaces and the other end being attached proximate the other of said radially extending surfaces, and having said ring tensioned for swinging into encircling relation to the element in the coupling into which said body member is removably insertable for anchoring said body member therein; said ring being fashioned with a loop at one end thereof and having said loop wrapped around the body and disposed in axially abutting relation with one of said radially extending surfaces; the other one of said projections being fashioned with a transversely extending recess therein and having the other end of said ring rotatably positioned in said recess; said looped end of said ring being slidable axially relative to the other end of said ring along the longitudinal axis of the body to permit deflection of the ring in order to permit passing the ring past the said one end of the body member while concurrent therewith encircling the apertured element of the coupling.

5. A releasable locking pin for securing elements of a coupling together, comprising: an elongated body member having a plurality of abutment-forming projections proximate one end thereof and spaced from one another along the longitudinal axis of said member, and having said projections fashioned to provide a radially extending surface on each thereof with said surfaces disposed to face one another; a split, coiled and generally spiral-shaped resilient ring mounted for swinging movement on the body, and having opposite ends thereof attached to the body at points spaced from one another along the longitudinal axis of the body and having at least one of said ends disposed to engage in axially abutting relation one of said radially extending surfaces with the other end of said ring being attached proximate the opposite one of said radially extending surfaces; said ring being tensioned so as to normally have the ring abut in biased relation one side of the body member; said ring being arranged with one end axially movable relative to the other end thereof along the longitudinal axis of the body and in the space between said projections to permit deflection of the ring to permit passing the ring past an opposite end of the body member so as to thereafter abut in biased relation an opposite side of said body member.

6. A releasable locking pin for insertion in an apertured element proximate an end of the element for holding said element in assembled relation relative to another element in a coupling, comprising: an elongated stem member having one end thereof adapted for removable insertion in the aperture of the apertured element of the coupling; said stem having an enlarged head at an opposite end thereof and fashioned with a radially extending surface spaced inwardly from an outer end of said head, and an abutment-forming projection spaced axially inwardly from said head and providing a radially extending surface thereon facing the radially extending surface of said head; a split, coiled resilient ring mounted for swinging movement on the stem, and having one end of the ring attached to the stem proximate the radially extending surface of said enlarged head and one end attached proximate the radially extending surface of said projection; said ring being tensioned for swinging into encircling relation to the apertured element of the coupling and for normally abuttingly engaging in biased relation one side of said stem; said ring being arranged so that the end of the ring disposed proximate said enlarged head abuttingly engages the radially extending surface thereof and is slidable axially along the longitudinal axis of the stem toward the other end of said ring to permit deflection of the ring in order to permit passing the ring past the end of said stem adapted for removable insertion in an apertured element and thereafter permit the ring to abuttingly engage in biased relation an opposite side of said stem while concurrent therewith encircling the apertured element of the coupling.

References Cited in the file of this patent
UNITED STATES PATENTS

| 470,507 | Risser | Mar. 8, 1892 |
| 763,883 | Harlow et al. | June 28, 1904 |
| 2,514,594 | Weiler | July 11, 1950 |
| 2,674,169 | Sawyer | Apr. 6, 1954 |
| 2,856,806 | Gibbons | Oct. 21, 1958 |

FOREIGN PATENTS

| 218,550 | Germany | Feb. 1, 1910 |